Figure 1:
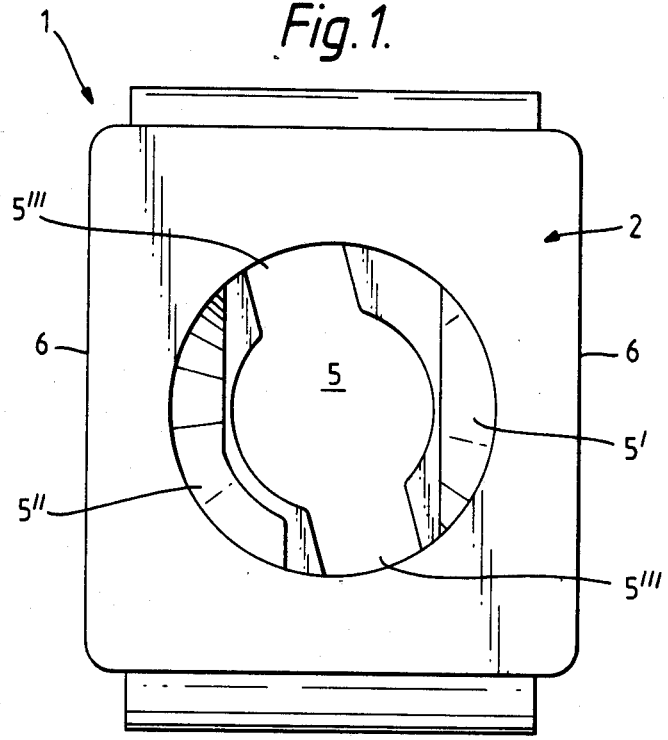

United States Patent [19]

Wright

[11] Patent Number: 4,677,714

[45] Date of Patent: Jul. 7, 1987

[54] QUICK-RELEASE FASTENER

[75] Inventor: Andrew C. W. Wright, Surrey, England

[73] Assignee: Dzus Fastener Co. Inc., West Islip, N.Y.

[21] Appl. No.: 876,718

[22] Filed: Jun. 20, 1986

[30] Foreign Application Priority Data

Jul. 11, 1985 [GB] United Kingdom ............... 8517548

[51] Int. Cl.⁴ ............................................. F16B 21/00
[52] U.S. Cl. ....................................... 24/590; 24/297; 411/508; 411/554
[58] Field of Search ................. 24/590, 591, 592, 593, 24/453, 289, 297; 411/503, 508, 511, 554

[56] References Cited

U.S. PATENT DOCUMENTS

| 1,270,141 | 6/1918 | Fuller | 24/590 |
|---|---|---|---|
| 2,191,773 | 2/1940 | Place | 24/453 |
| 2,836,215 | 5/1958 | Rapata | 24/297 |
| 3,991,446 | 11/1976 | Mooney et al. | 411/508 |
| 4,470,178 | 9/1984 | Matsui | 24/297 |
| 4,506,419 | 3/1985 | Mitomi | 24/297 |

FOREIGN PATENT DOCUMENTS

| 240118 | 9/1960 | Australia | 24/297 |
|---|---|---|---|
| 0094150 | 11/1983 | European Pat. Off. . | |
| 0115671 | 8/1984 | European Pat. Off. . | |
| 884815 | 12/1961 | United Kingdom . | |
| 1004258 | 9/1965 | United Kingdom | 411/544 |
| 1390008 | 4/1975 | United Kingdom . | |
| 2091801 | 8/1982 | United Kingdom | 24/289 |

*Primary Examiner*—Victor N. Sakran
*Attorney, Agent, or Firm*—Kane, Dalsimer, Kane, Sullivan and Kurucz

[57] ABSTRACT

A one-piece receptacle (1) for a quick-release fastener, has a base portion (2) and a stud-retaining structure (4) connected to the base portion by a pair of resilient webs (3) substantially C-shaped in cross-section. The base portion has a cross-cut slot (8) in a plane transverse to the central axis of the receptacle. The C-shaped webs (3) are integrally connected to the base portion (2) in extension of a thin walled portions (2") closer to the stud-retaining structure (4). The slot (8) extends from one side of the receptacle across the central axis thereof, so that the opposing thin walled portions (2,2") of the base on opposite sides of the cross-cut slot (8) can engage opposite surfaces of the support member at an aperture in which the receptacle is to be mounted.

3 Claims, 7 Drawing Figures

QUICK-RELEASE FASTENER

The present invention relates to a quick-release fastener for fastening together two members such as a pair of adjacent panels.

One such fastener is described in GB-A-No. 1390008 which discloses a quick-release fastener having a receptacle for mounting on one of the two members which are to be fastened together and a complementary stud retained on the second of the members. The receptacle described in GB-A-No. 1390008 has a base part whih includes projections arranged to extend through an aperture in the part to which it is to be attached for engaging a remote face of that part to secure the receptacle in the aperture. In order to aid this the base part has a cross-slot in a plane parallel with the receptacle axis which enables opposed portions to be squeezed together for pushing through the Operture. Such a receptacle is suitable for mounting only from the rear of the panel or support on which it is to be mounted (i.e. the face remote from the side from which the stud is inserted) due to the width of the remaining parts of the receptacle. Whilst a similar receptacle could be manufactured with a base portion having a greater width than that of the remaining parts of the receptacle so that the receptacle could be mounted from the front, the length of the aperture in which the fastener could be mounted would have to be substantially increased in order to accomodate the passage of the other parts of the fastener through the aperture. This is disadvantageous as the receptacle may slide along the aperture so that when a panel carrying a stud to be mounted in the receptacle is presented to the support the stud may not be in alignment with the receptacle.

Figure 2:
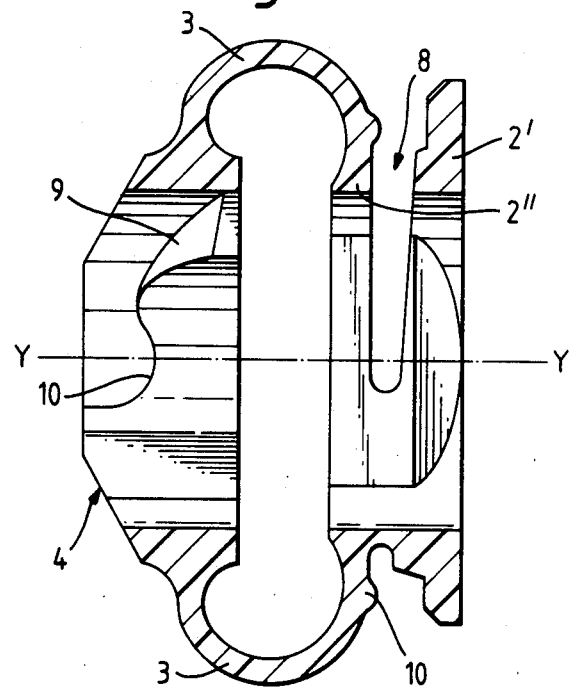

There is a need therefore for a receptacle which can be mounted from the front in an aperture as small as possible commensurate with the size of the receptacle. A first type of receptacle which meets this requirement is shown in FIGS. 1 and 2 of EP-A-No. 0115671 and a second type of receptacle meeting this requirement is shown in EP-A-No. 0094150. In the first example a pair of outwardly diverging flanges are snap-fitted through an aperture from the front, the flanges engaging the rear of the member to retain the receptacle in the aperture. This type of construction would be extremely difficult to achieve with fasteners having certain types of coupling. The second example relates to a multi-part metal receptacle and would not be suitable for adaption to plastics fasteners in general.

GB-A-No. 884815 show a solid plastics anchor grommet having a pair of cross-cut slots, one on either side of the grommet enabling it to be tilted and then slipped onto a support at an aperture.

According to the present invention, there is provided a one-piece receptacle for a quick-release fastener, having a base portion and a stud-retaining structure connected to the base portion by a pair of resilient webs substantially C-shaped in cross-section, the base portion having a cross-cut slot in a plane transverse to the central axis of the receptacle, defined by a pair of thin walled portions on either side of the slot, the C-shaped webs being integrally connected to the base portion in extension of the thin walled portion closer to the stud-retaining structure, and the slot extending from one side of the receptacle across the central axis thereof, whereby the opposing thin walled portions of the base on opposite sides of the cross-cut slot can engage opposite surfaces of the support member at an aperture in which the receptacle is to be mounted, enabling, during mounting of the receptacle, a part of the support immediately adjacent the aperture, to pass into the cross-cut slot whereafter the stud-retaining structure can be passed fully through the aperture prior to the receptacle being slid back in the opposite direction for final engagement of the base part in the aperture.

Thus, this construction enables the receptable to be mounted in an aperture from the front face of the support, even though the retention structure of the receptacle has a greater length than the length of the base portion.

The stud-retaining structure preferably comprises a coupling socket for engagement with corresponding parts of the stud of the fastener and the C-shaped resilient webs extend outwardly from opposite ends of the base to connect with opposite ends of the socket.

The thin walled portions above and below the support permit greater deflection on installation and thus a relatively larger coupling socket can fit in a relatively smaller hole.

The receptacle is able to be mounted in a hole of minimal size relative to the size of the receptacle so that sliding movement of the receptacle in the hole can be prevented. A further advantage is that the relative smallness of the hole avoids cutting and weakening the support.

Because the wall of the base below the support is connected to the coupling socket by a semi-circle of resilient plastics, on operation of the fastener this acts firstly as a spring, and then may also deflect to clamp the support as the stud is rotated into the engaged position.

Figure 3:
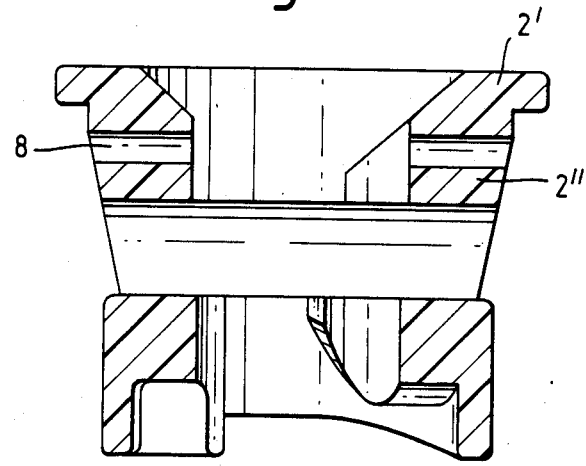
Figure 4:
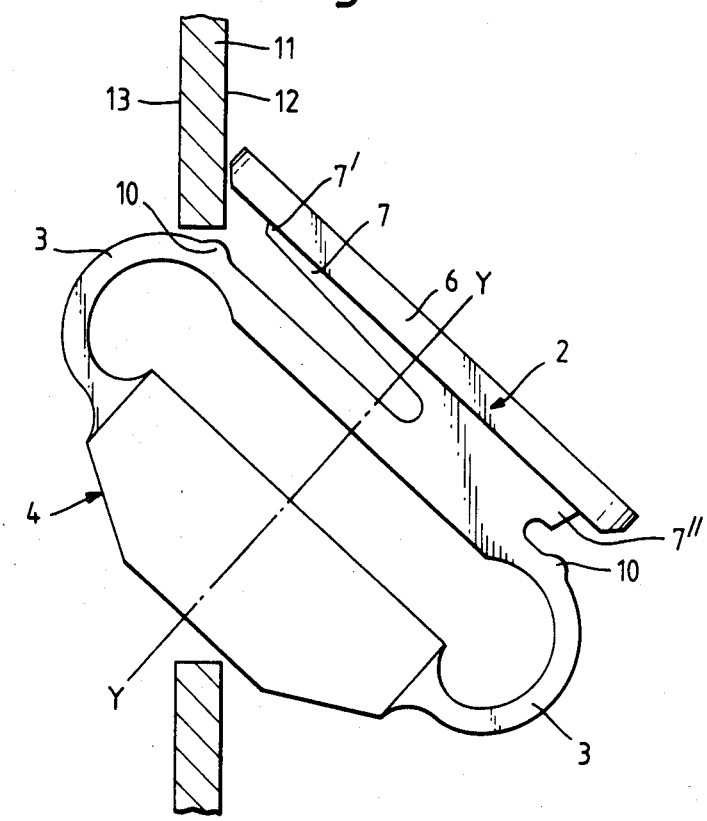
Figure 5:
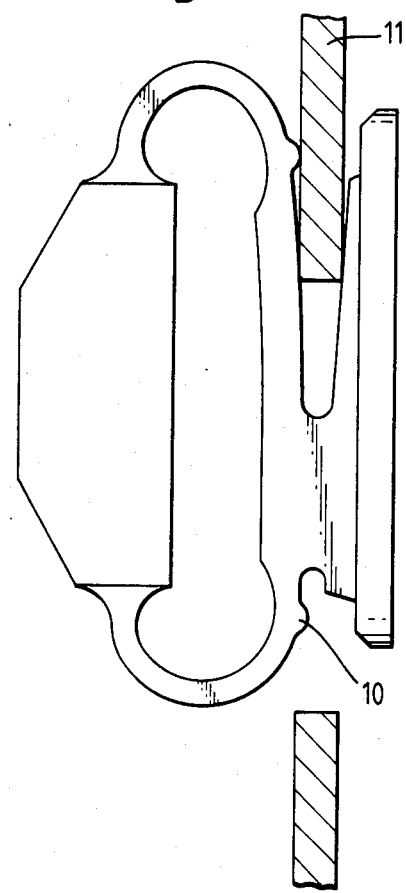
Figure 6:
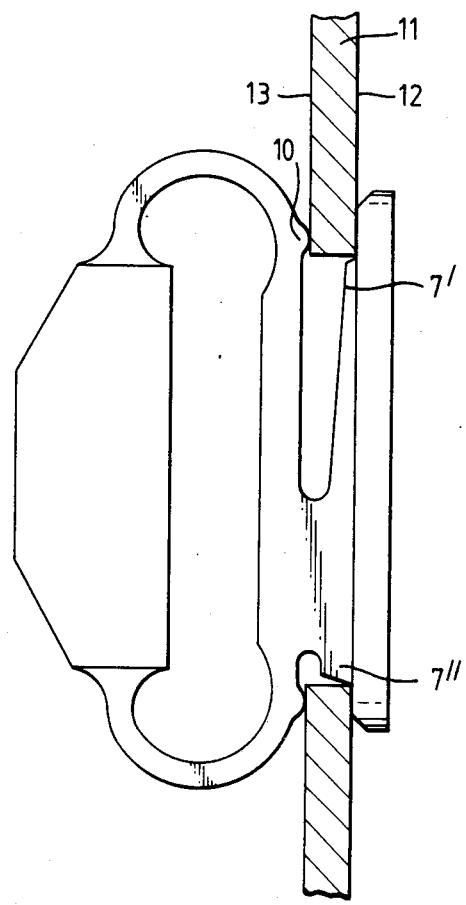
Figure 7:
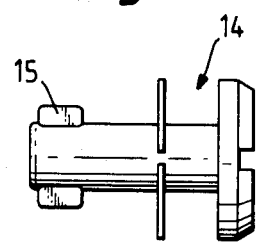

One example of a fastener constructed in accordance with the present invention will now be described with reference to the accompanying drawings in which:

FIG. 1 shows the receptacle in plan view;
FIG. 2 shows a cross-section through the receptacle;
FIG. 3 shows an axial section through the receptacle;
FIGS. 4 to 6 show side views of the receptacle at three different stages of mounting the receptacle in a support and,
FIG. 7 shows a stud for use with the receptacle.

The receptacle 1 is formed of a resilient plastics material formed in one piece and has a base 2 integral with one end of each of a pair of opposed C-shaped spring loop portions or webs 3 which in turn are integral at their other ends with a stud-retaining socket 4.

The base 2 has a central aperture 5 which in use receives the shank of the stud, the longer sides 6 of the base being undercut at 7 and providing a shoulder 7' at the open end of the slot 8, opposite the shoulder 7'' formed at the other side of the receptacle, the shoulders preventing sideways movement of the receptacle in use (see FIG. 6). Chamfers 5',5'' are formed on opposite sides of the aperture to cooperate with the cross-bar lugs on the stud to cause a camming action to rotate the stud to an angular position substantially aligned with the entry slots 5''' to the cam surfaces 9, the chamfer 5'' extending further around the aperture 5 than the opposing chamfer 5'. Extending in a plane transverse to the longitudinal axis Y-Y of the receptacle (i.e. the axis along which the stud passes in use) the cross-cut slot 8 is formed, dividing the base into two thin walled portions 2',2''. The slot 8 extends transversely across the receptacle over a distance slightly greater than half its length so as to cross the axis Y-Y, as can be seen clearly in FIGS. 2, 4, 5 and 6. The portion of the base 2" connects with the C-shaped spring loops 3.

The socket 4 has a pair of cam surfaces 9 along which the cross-bar of the stud moves in use to secure the fastener, the cam surfaces 9 including a detent portion 10 which defines the fastener's position in use.

Each of the C-shaped spring loop portions has a projecting ridge 10 which extends across the width of the fastener for a purpose to be described later.

As FIGS. 4, 5 and 6 show, the fastener can be mounted at a hole in a support 11, the open mouth of the slot 8 being presented to one side of the hole and thereafter the receptacle being pushed over that side of the hole so that the opposed portions 2',2" of the base 2 surround and engage opposite surfaces 12, 13 of the support. As the edge of the support passes down the slot 8 so the C-shaped spring loop on the opposite side is able to pass through the hole and once it has done so the receptacle can be slid back to the position shown in FIG. 6 in which it is fully held with the ridges 10 on the C-shaped spring loops engaging the rear surface 13 of the support and the portion 2' of the base 2 engaging the front surface 12.

When the stud 14 is inserted and the cross-bar 15 engages and slides along the cam surfaces 9, substantially symmetrical forces are applied through the C-shaped spring loop portions 3 and through the ridges 10 onto the support, substantially ensuring that the receptacle retains its axial alignment and is not distorted, ensuring easy and secure insertion of the stud every time.

The relative thinness of the portions 2',2" offers a low stand-off of any panel which is to be attached to the support 11, and also enables deflection to accommodate various support thicknesses without rattle or looseness.

I claim:

1. A one-piece receptacle for a quick-release fastener provided with a stud, for mounting in an aperture on a support, said receptacle having:
    a central axis;
    a base portion;
    a stud-retaining structure having a coupling socket for engagement with corresponding parts of a stud of said fastener;
    a pair of resilient webs substantially C-shaped in cross-section and connecting said stud-retaining structure to said base portion, said C-shaped resilient webs extending outwardly from opposite ends of said base to connect with opposite ends of said socket;
    said base portion having a pair of thin walled portions defining a cross-cut elongate slot in a plane transverse to said central axis of the receptacle; and,
    said C-shaped webs being integrally connected to said base portion in extension of the one of said thin walled portions closer to said stud-retaining structure, and said slot extending from one side of the receptacle across said central axis thereof, whereby said opposing thin walled portions of said base on opposite sides of said cross-cut slot can engage opposite surfaces of said support adjacent said aperture in which said receptacle is mounted.

2. A receptacle according to claim 1, formed of a resilient plastics material.

3. A quick-release fastener comprising a stud, and a one-piece receptacle for a quick-release fastener, for mounting in an aperture on a support, said receptacle having:
    a central axis;
    a base portion;
    a stud-retaining structure having a coupling socket for engagement with corresponding parts of a stud of said fastener;
    a pair of resilient webs substantially C-shaped in cross-section and connecting said stud-retaining structure to said base portion, said C-shaped resilient webs extending outwardly from opposite ends of said socket to connect with opposite ends of said socket;
    said base portion having a pair of thin wall portions defining a cross-cut elongate slot in a plane transverse to said central axis of the receptacle; and,
    said C-shaped webs having integrally connected to said base portion in extension of the one of said thin walled portions closer to said stud-retaining structure, and said slot extending from one side of the receptacle across said central axis thereof, whereby said opposing thin walled portions of said base on opposite sides of said cross-cut slot can engage opposite surfaces of said support adjacent said aperture in which said receptacle is mounted.

* * * * *